(12) United States Patent
Koresawa et al.

(10) Patent No.: US 7,675,530 B2
(45) Date of Patent: Mar. 9, 2010

(54) MOVING-IMAGE REPRODUCTION APPARATUS, MOVING-IMAGE REPRODUCTION METHODS, PROGRAMS AND RECORDING MEDIUMS

(75) Inventors: Akio Koresawa, Kanagawa (JP); Ryu Sukigara, Kanagawa (JP); Yoichi Ohshige, Kanagawa (JP); Takashi Takeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1317 days.

(21) Appl. No.: 11/139,555

(22) Filed: May 31, 2005

(65) Prior Publication Data

US 2005/0271356 A1 Dec. 8, 2005

(30) Foreign Application Priority Data

Jun. 8, 2004 (JP) ............... 2004-170502

(51) Int. Cl.
*G09G 5/10* (2006.01)

(52) U.S. Cl. ............... 345/690; 345/204; 345/156; 348/333.02

(58) Field of Classification Search ............... 345/156, 345/204, 98, 690, 89, 94; 348/333.02, 333.11, 348/E5.035, E5.047, 231.99; 715/861
See application file for complete search history.

(56) References Cited

U.S. PATENT DOCUMENTS 6,683,650 B1 * 1/2004 Yamamoto et al. ..... 348/333.12

2004/0130635 A1 * 7/2004 Kasai ............... 348/231.99

FOREIGN PATENT DOCUMENTS

| JP | 07-134577 | 5/1995 |
|----|-----------|--------|
| JP | 08-079197 | 3/1996 |
| JP | 2000-032338 | 1/2000 |
| JP | 2000-41197 | 2/2000 |
| JP | 2001-056675 | 2/2001 |

* cited by examiner

*Primary Examiner*—Kevin M Nguyen
(74) *Attorney, Agent, or Firm*—Oblon, Spivak, McClelland, Maier & Neustadt, L.L.P.

(57) ABSTRACT

A moving-image reproduction apparatus includes a display section for displaying an image in a moving-image display area; a moving-image data storage section for storing a plurality of pieces of moving-image data; a moving-image data reproduction section for reading out moving-image data and reproducing the moving-image data; a moving-image change-over command section for requesting change-over from a preceding moving image to a succeeding moving image; and a control section for changing-over from a preceding moving image to a succeeding moving image in accordance with the request. During a period of time lasting till the start of a process to actually display a reproduced moving image based on the moving-image data, the control section stops reproduction of the preceding moving image and reduces the brightness of the moving-image display area to a value corresponding to a black moving image in a predetermined period of time.

5 Claims, 15 Drawing Sheets

F I G . 1
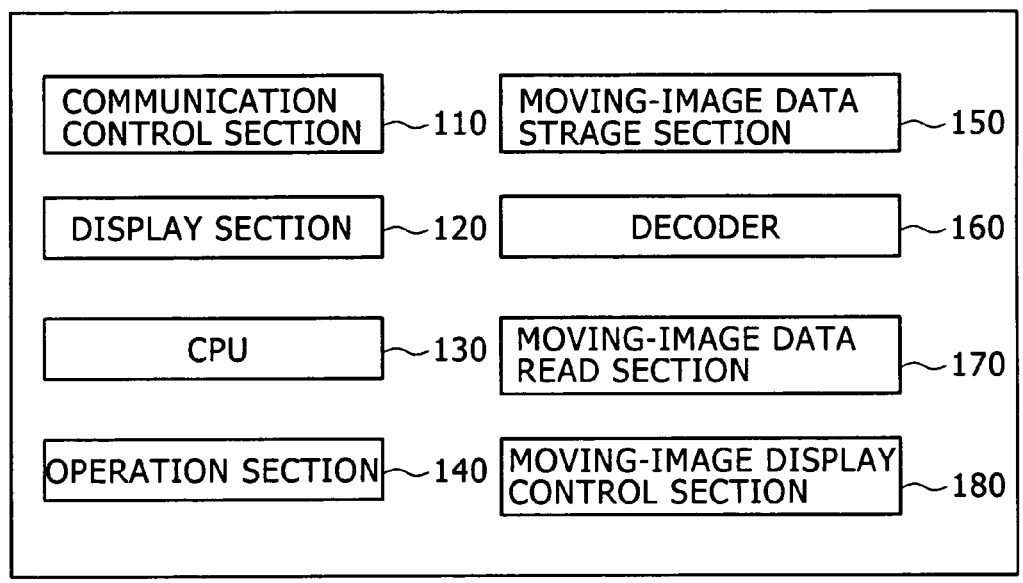

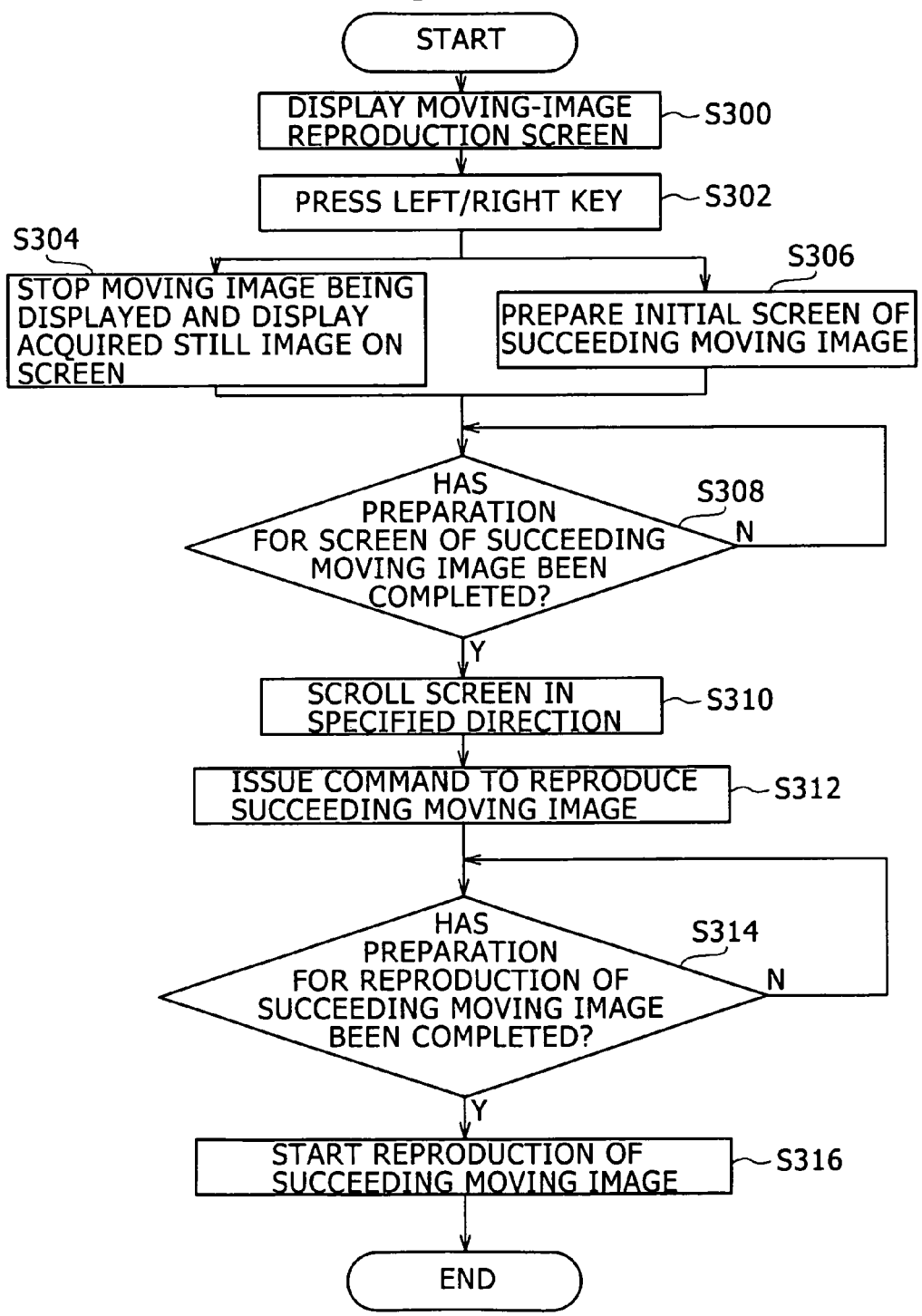

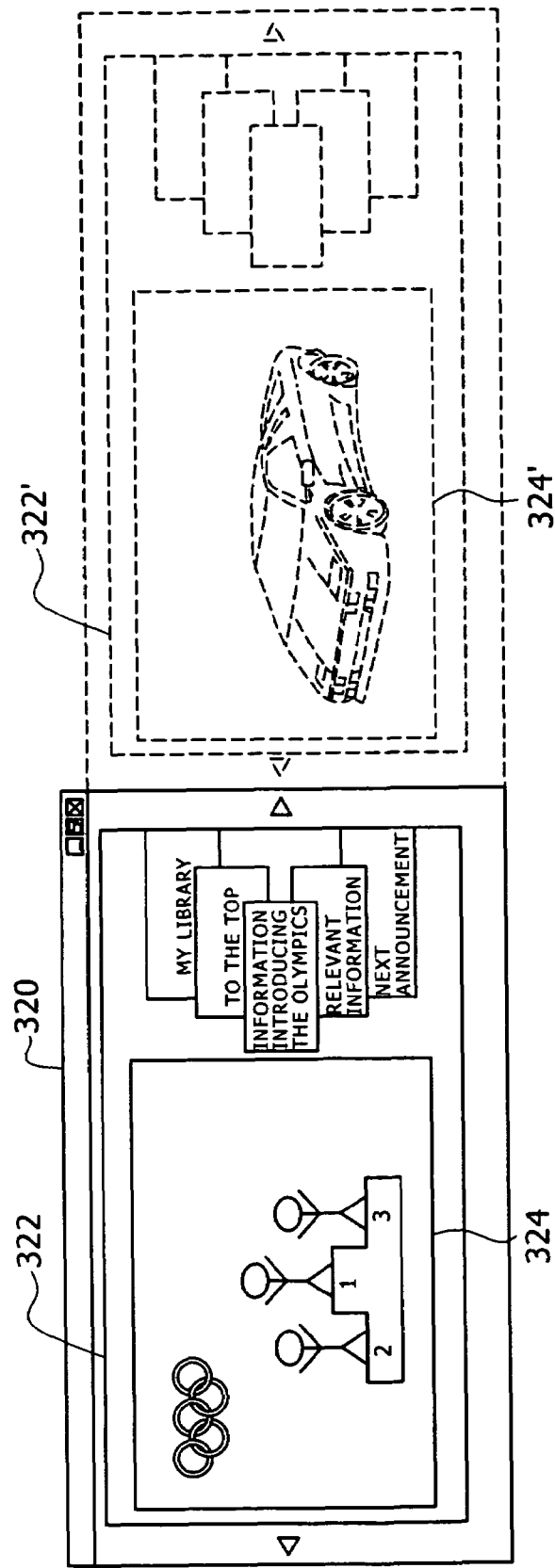

MOVING-IMAGE REPRODUCTION APPARATUS, MOVING-IMAGE REPRODUCTION METHODS, PROGRAMS AND RECORDING MEDIUMS

BACKGROUND OF THE INVENTION

The present invention relates to a moving-image reproduction apparatus, a moving-image reproduction method, a program and a recording medium. More particularly, the present invention relates to a moving-image reproduction apparatus capable of changing over a moving image from one to another and relates to a moving-image reproduction method adopted by the moving-image reproduction apparatus, a program for implementing the moving-image reproduction method as well as a recording medium for storing the program.

An image-processing apparatus has been developed as a conventional apparatus for continuously reproducing a still image by rolling a plurality of still-image pages as described in a document such as patent document 1: Japanese Patent Laid-open No. Hei 8-79197. In accordance with patent document 1, it is possible to select a display object included in an object as an object to be actually displayed in accordance with the position of the object on a screen and position the selected display object. For example, by operating a cursor to go to the immediately succeeding page or return to the immediately preceding page of a still image such as a newspaper article, a newspaper image including a plurality of objects can be inspected.

In recent years, on the other hand, the computer is capable of continuously reproducing an image by changing over a plurality of moving images. In this case, first of all, when a predetermined moving-image change instruction is received while a preceding first moving image is being reproduced as a picture at a predetermined display position, a decoder starts an operation to decode a succeeding second moving image and, as soon as the preparation for reproduction of the succeeding second moving image is completed, the second moving image is reproduced to replace the first moving image.

There is raised a problem, however, that in an operation to continuously reproduce a plurality of moving images, a processing load borne by a CPU increases excessively in comparison with the operation to continuously reproduce still images as described in patent document 1 when a moving image is changed over from one to another.

On the other hand, when a moving image reproduced by a personal computer is changed over, a blank time is generated on the screen, giving discomfort to the user. In addition, in one case to eliminate the discomfort, for example, 2 moving images, i.e., a preceding moving image and a succeeding moving image on the screen of the personal computer, are changed over while these images are moving. In another case to eliminate the discomfort, the frame of a moving image is shrunk or enlarged repeatedly to add dynamic elements between operations to change over the moving image. Either of the cases raises a problem that the processing load borne by the CPU increases to a very large magnitude.

SUMMARY OF THE INVENTION

The inventors of the present invention have proposed a new improved moving-image reproduction apparatus, a new and improved moving-image reproduction method and the like capable of changing over a moving image while minimizing the processing load borne by the CPU and without giving discomfort to the user.

In order to solve the problems described above, according to an embodiment of the present invention, there is provided a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a moving-image change-over command section for making a request for a change-over from a first moving image displayed earlier to a second moving image; and a control section for carrying out a change-over from a first moving image to a second moving image in accordance with the request made by the moving-image change-over command section, wherein, during a period of time lasting till a start of a process carried out by the moving-image data reproduction section to actually reproduce data of a second moving image, the control section stops reproduction of the first moving image and reduces the brightness of the moving-image display area to a value corresponding to a black moving image in a predetermined period of time.

In the present invention described above, a processing load borne by a CPU is reduced to a minimum and a change-over from a preceding moving image to a succeeding moving image can be carried out without giving discomfort to the user by an effect of the sense of sight. That is to say, a change-over from a preceding moving image to a succeeding moving image is carried out to result in a seamless moving image by allowing both the preceding moving image and the succeeding moving image to coexist. Thus, for example, the display quality of a display screen of a computer can be improved.

In order to solve the problems described above, according to another embodiment of the present invention, there is provided a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a still-image storage section for storing data of one or more still images; a moving-image change-over command section for making a request for a change-over from a first moving image displayed earlier to a second moving image; and a control section for carrying out a change-over from a first moving image to a second moving image in accordance with the request made by the moving-image change-over command section, wherein, during a period of time lasting till a start of a process carried out by the moving-image data reproduction section to actually reproduce data of a second moving image, the control section stops reproduction of the first moving image and displays one of the still images stored in the still-image storage section in the moving-image display area.

In an operation to change over a moving image in the present invention described above, a still image prepared in advance is displayed in the moving-image display area. Thus, a processing load borne by a CPU can be reduced to a minimum in the change-over from a preceding moving image to a succeeding moving image. In addition, since an effect of the sense of sight is enhanced, the change-over from a preceding moving image to a succeeding moving image can be carried out without giving discomfort to the user.

In addition, if the present invention described above is implemented as a configuration in which each of the still images is assigned to respective moving image in advance, in a period of time prior to an operation to display a succeeding moving image, a proper still image assigned in advance to the succeeding moving image is displayed. As a result, the user can be relieved from discomfort more effectively.

On the top of that, if the present invention described above is implemented as a configuration in which the displayed still image is taken from the initial screen of the second moving image, the still image is displayed as an image to be inspected next by the user. As a result, the user can be relieved from discomfort even more effectively.

In order to solve the problems described above, according to a further embodiment of the present invention, there is provided a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a still-image acquisition section for acquiring a still image from a moving image being displayed in the moving-image display area; a moving-image change-over command section for making a request for a change-over from a first moving image displayed earlier to a second moving image; and a control section for carrying out a change-over from a first moving image to a second moving image in accordance with the request made by the moving-image change-over command section, wherein, during a period of time lasting till a start of a process carried out by the moving-image data reproduction section to actually reproduce data of a second moving image, the control section stops reproduction of the first moving image and displays a still image acquired by the still-image acquisition section in the moving-image display area.

In the present invention described above, the still-image acquisition section is capable of capturing a still image from a moving image being displayed at a point of time a particular button is pressed. That is to say, during a period of time lasting till completion of a process to decode a succeeding moving image into a displayable image, the preceding moving image is displayed as the still image so that a change-over from a preceding moving image to a succeeding moving image can be carried out to result in a seamless moving image by allowing both the preceding moving image and the succeeding moving image to coexist. Thus, the display quality can be improved. As a result, a change-over from a preceding moving image to a succeeding moving image can be carried out without giving discomfort to the user by an effect of the sense of sight.

In addition, if the present invention described above is implemented as a configuration in which the control section changes over the moving-image screen by inserting a moving-image display area showing a second moving image into the display section in a manner interlocked with an operation to move out a moving-image display area showing a first moving image from the display section, a dynamic element is added to the display area. As a result, the user can be relieved from discomfort more effectively.

On the top of that, if the present invention described above is implemented as a configuration in which the control section changes over the moving-image screen while changing at least either the size or display location of the moving-image display area showing a first moving image or the moving-image display area showing a second moving image, more dynamic elements are added to the display area. As a result, the user can be relieved from discomfort even more effectively.

In order to solve the problems described above, according to a still further embodiment of the present invention, there is provided a moving-image reproduction.

In order to solve the problems described above, according to a yet further embodiment of the present invention, there is provided a moving-image reproduction method adopted by a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a still-image storage section for storing data of one or more still images; a moving-image change-over command section for making a request for a change-over from a first moving image displayed earlier to a second moving image; and a control section for carrying out a change-over from a first moving image to a second moving image in accordance with the request made by the moving-image change-over command section, whereby, if the moving-image change-over command section makes a request for a change-over from a first moving image displayed earlier to a second moving image, during a period of time lasting till a start of a process carried out by the moving-image data reproduction section to actually reproduce data of a second moving image, the control section stops reproduction of the first moving image and displays one of the still images stored in the still-image storage section in the moving-image display area.

In an operation to change over a moving image in the present invention described above, a still image prepared in advance is displayed in the moving-image display area. Thus, a processing load borne by a CPU can be reduced to a minimum in the change-over from a preceding moving image to a succeeding moving image. In addition, since an effect of the sense of sight is enhanced, the change-over from a preceding moving image to a succeeding moving image can be carried out without giving discomfort to the user.

In addition, if the present invention described above is implemented as a configuration in which each of the still images is assigned to a second moving image in advance, in a period of time prior to an operation to display a succeeding moving image, a proper still image assigned in advance to the succeeding moving image is displayed. As a result, the user can be relieved from discomfort more effectively.

On the top of that, if the present invention described above is implemented as a configuration in which the displayed still image is taken from the initial screen of the second moving image, the still image is displayed as an image to be inspected next by the user. As a result, the user can be relieved from discomfort even more effectively.

In order to solve the problems described above, according to a yet further embodiment of the present invention, there is provided a moving-image reproduction method adopted by a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a still-image acquisition section for acquiring a still image from a moving image being displayed in the moving-image display area; a moving-image change-over command section for making a request for a change-over from a first moving image displayed earlier to a second moving image; and a control section for carrying out a change-over from a first moving image to a second moving image in accordance with the request made by the moving-image change-over command section, whereby, if the moving-image change-over command section makes a request for a change-over from a first moving image displayed earlier to a second moving image, during a period of time lasting till a start of a process carried out by the moving-image data reproduction section to actually reproduce data of a second moving image, the control section stops reproduction of the first moving image and displays a still image acquired by the still-image acquisition section in the moving-image display area.

In the present invention described above, the still-image acquisition section is capable of capturing a still image from a moving image being displayed at a point time a particular button is pressed. That is to say, during a period of time lasting till completion of a process to decode a succeeding moving image into a displayable image, the preceding moving image is displayed as the still image so that a change-over from a preceding moving image to a succeeding moving image can be carried out to result in a seamless moving image by allowing both the preceding moving image and the succeeding moving image to coexist. Thus, the display quality can be improved. As a result, a change-over from a preceding moving image to a succeeding moving image can be carried out without giving discomfort to the user by an effect of the sense of sight.

In addition, if the present invention described above is implemented as a configuration in which the control section changes over the moving-image screen by inserting a moving-image display area showing a second moving image into the display section in a manner interlocked with an operation to move out a moving-image display area showing a first moving image from the display section, a dynamic element is added to the display area. As a result, the user can be relieved from discomfort more effectively.

On the top of that, if the present invention described above is implemented as a configuration in which the control section changes over the moving-image screen while changing at least either the size or display location of the moving-image display area showing a first moving image or the moving-image display area showing a second moving image, more dynamic elements are added to the display area. As a result, the user can be relieved from discomfort even more effectively.

In order to solve the problems described above, according to a yet further embodiment of the present invention, there is provided a program to be executed by a computer for driving a moving-image reproduction apparatus including: a display section for displaying an image in a moving-image display area capable of accommodating at least a moving image; a moving-image data storage section for storing a plurality of pieces of moving-image data; a moving-image data reproduction section for reading out moving-image data from the moving-image data storage section and reproducing the moving-image data; a moving-image change-over command section for making a request for a change-over from a first moving image displayed earlier to a second moving image; and a control section for carrying out a change-over from a first moving image to a second moving image in accordance with the request made by the moving-image change-over command section, wherein, during a period of time lasting till a start of a process carried out by the moving-image data reproduction section to actually reproduce data of a second moving image, the control section stops reproduction of the first moving image and reduces the brightness of the moving-image display area to a value corresponding to a black moving image in a predetermined period of time.

In order to solve the problems described above, according to a yet further embodiment of the present.

In the present invention, a processing load borne by a CPU is reduced to a minimum and a change-over from a preceding moving image to a succeeding moving image can be carried out without giving discomfort to the user by an effect of the sense of sight. That is to say, a change-over from a preceding moving image to a succeeding moving image can be carried out to result in a seamless moving image by allowing both the preceding moving image and the succeeding moving image to coexist. Thus, for example, the display quality of a display screen of a computer can be improved.

BRIEF DESCRIPTION OF THE DRAWINGS

FIG. 1 is a block diagram showing the configuration of a moving-image reproduction apparatus 10 according to a first embodiment;

FIG. 14 shows a flowchart representing a method to reproduce a moving image in accordance with the third embodiment; and FIG. 15 is an explanatory diagram showing a typical state in which a succeeding moving image is scrolled and finally disappears while a succeeding moving image is moving from the right side to the left side gradually in accordance with the third embodiment.

DETAILED DESCRIPTION OF THE PREFERRED EMBODIMENTS

Figure 2:
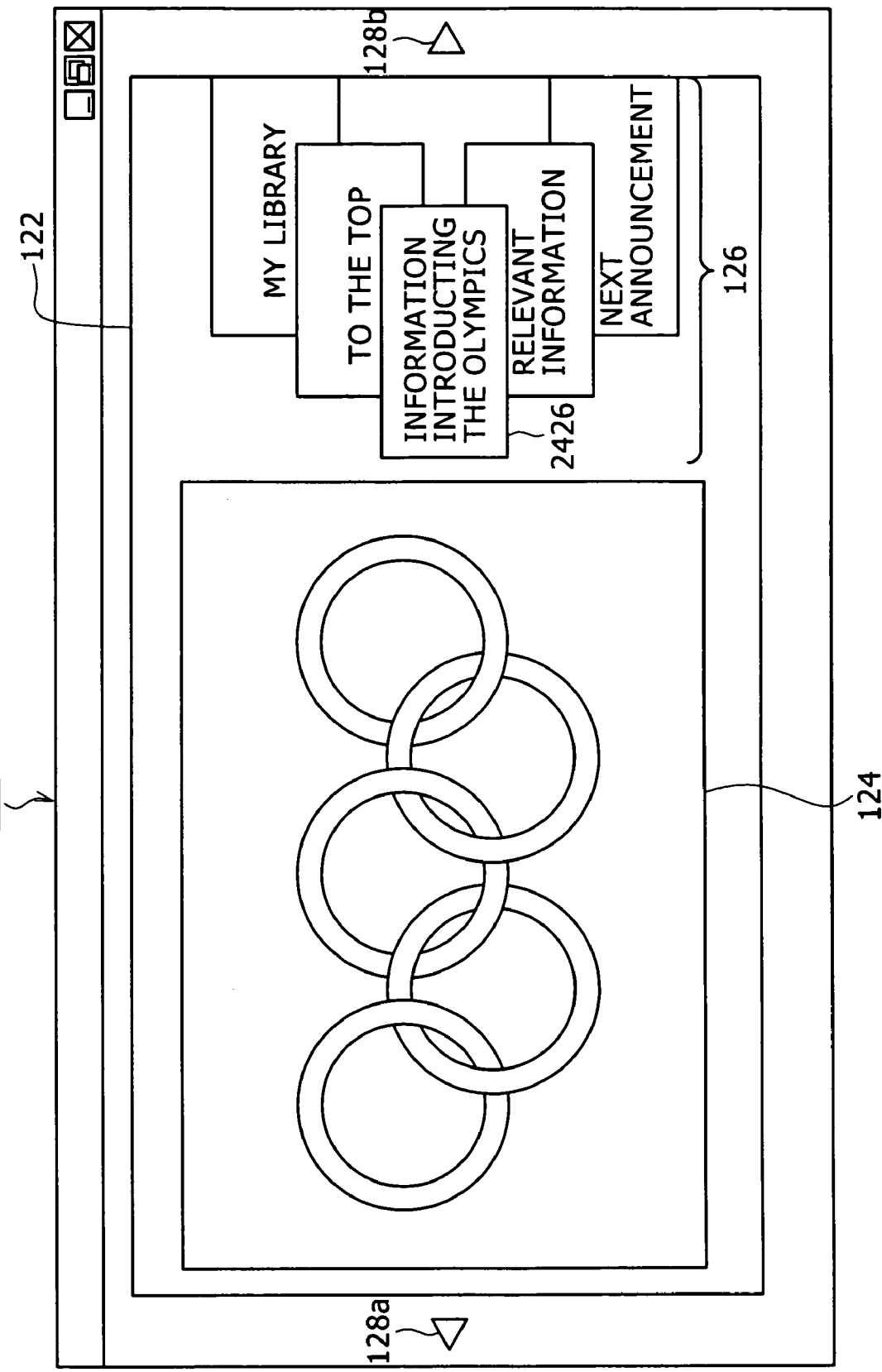
FIG. 2 is an explanatory diagram showing a typical screen of a preceding moving image according to the first embodiment.

Preferred embodiments of the present invention are explained in detail by referring to diagrams as follows. Configuration elements having essentially identical functional configurations are each denoted by the same reference numeral throughout this specification and all diagrams, being explained only once in order to avoid duplication of description.

First Embodiment

First of all, by referring to FIG. 1, the configuration of a moving-image reproduction apparatus 10 according to a first embodiment is explained. It is to be noted that FIG. 1 is a block diagram showing the configuration of the moving-image reproduction apparatus 10 according to the first embodiment.

First of all, as shown in FIG. 1, the moving-image reproduction apparatus 10 according to the first embodiment has a communication control section 110, a display section 120, a CPU 130, an operation section 140, a moving-image data storage section 150, a decoder 160, a moving-image data read section 170 and a moving-image display control section 180. The communication control section 110 is a component for controlling communications with a moving-image-providing server for providing moving images. The display section 120 is a component for displaying a moving-image content transmitted by the moving-image-providing server (not shown in the figure). The CPU 130 is a component for executing entire control of the moving-image reproduction apparatus 10. The operation section 140 is a component used for carrying out a variety of operations of the moving-image reproduction apparatus 10. The moving-image data storage section 150 is a memory used for storing moving-image data received from the moving-image-providing server. The decoder 160 is a component for decoding moving-image data. The moving-image data read section 170 is a component for reading out moving-image data from the moving-image data storage section 150. The moving-image display control section 180 is a component for executing control of attributes of a moving image. The attributes include the display position and size of the moving image.

As described above, the communication control section 110 communicates with a moving-image-providing server for providing moving images. It is to be noted that this embodiment implements a typical configuration for acquiring a moving-image content from the moving-image-providing server. However, the present invention can be applied to applications in which moving-image data is acquired from a variety of recording mediums such as a DVD and stored in a hard disk.

As described above, the display section 120 displays a reproduced moving-image content. When the user operates the operation section 140 to change over a moving image, the moving image is displayed continuously from a preceding moving image to a succeeding one. It is to be noted that, when a moving image is changed over from a preceding moving image to a succeeding one in this embodiment, the brightness of the screen is reduced gradually to result in a black screen before the succeeding moving image is displayed. In this way, since the moving image is changed over from a preceding moving image to a succeeding one seamlessly, no stress is developed in the user.

The CPU 130 controls the entire moving-image reproduction apparatus 10. In this embodiment, an operation to change over a moving image is controlled so as to reduce the brightness of the screen of the display section 120 gradually at all but the same time as an operation to stop the moving image to result in a black screen before displaying the succeeding moving image. In this way, in the operation to change over a moving image, the screen is transiting to a black color gradually till a process to reproduce the succeeding moving image is completed. Thus, the processing load borne by the CPU can be reduced and, at the same time, dynamic elements can be added to the screen. As a result, a moving image can be changed over in such a way that no stress is given to the user. It is to be noted that, in this case, the process to reproduce a succeeding moving is mainly a decoding process.

The operation section 140 is a component operated by the user to drive the moving-image reproduction apparatus 10 to carry out a variety of operations such as operations to change the volume of a generated sound, change the size of a displayed screen, reproduce a moving image and stop reproduction of a moving image. Typically, the operation section 140 includes a keyboard and a mouse. By operating the operation section 140, an operation can be carried out to change a preceding moving image to a succeeding moving image.

As described above, the moving-image data storage section 150 is a memory used for storing moving-image data received from the moving-image-providing server. Moving-image data stored in the moving-image data storage section 150 can be read out by the moving-image data read section 170 in accordance with an operation carried out by the user on the operation section 140. The decoder 160 decodes the moving-image data read out by the moving-image data read section 170, and a moving image obtained as a result of the decoding process is displayed in a specified display area in accordance with control executed by the moving-image display control section 180. The moving-image data read section 170 is a component for reading out moving-image data specified by the user by operating the operation section 140 from the moving-image data storage section 150 synchronously with a synchronization signal. The moving-image display control section 180 executes control so as to output a reproduced moving image to a predetermined display position.

In a process to change a moving image displayed on the display section 120 to a succeeding moving image in this embodiment, the CPU 130 executes control so as to reduce the brightness of the screen gradually to 0 at the same time as an operation to stop the preceding moving image till a process to reproduce the succeeding moving image is completed, that is, till the preparation to reproduce the succeeding moving image is completed. Then, the display screen turns black and, as soon as the preparation for reproduction of the succeeding moving image is completed, the succeeding moving picture is reproduced.

As described above, in the embodiment, an operation to change over a moving image is controlled so as to reduce the brightness of the screen gradually at all but the same time as an operation to stop the moving image to result in a black screen before displaying the succeeding moving image. Thus, no processing load is borne by the CPU and no discomfort is felt by the user by an effect of the sense of sight.

Figure 3:
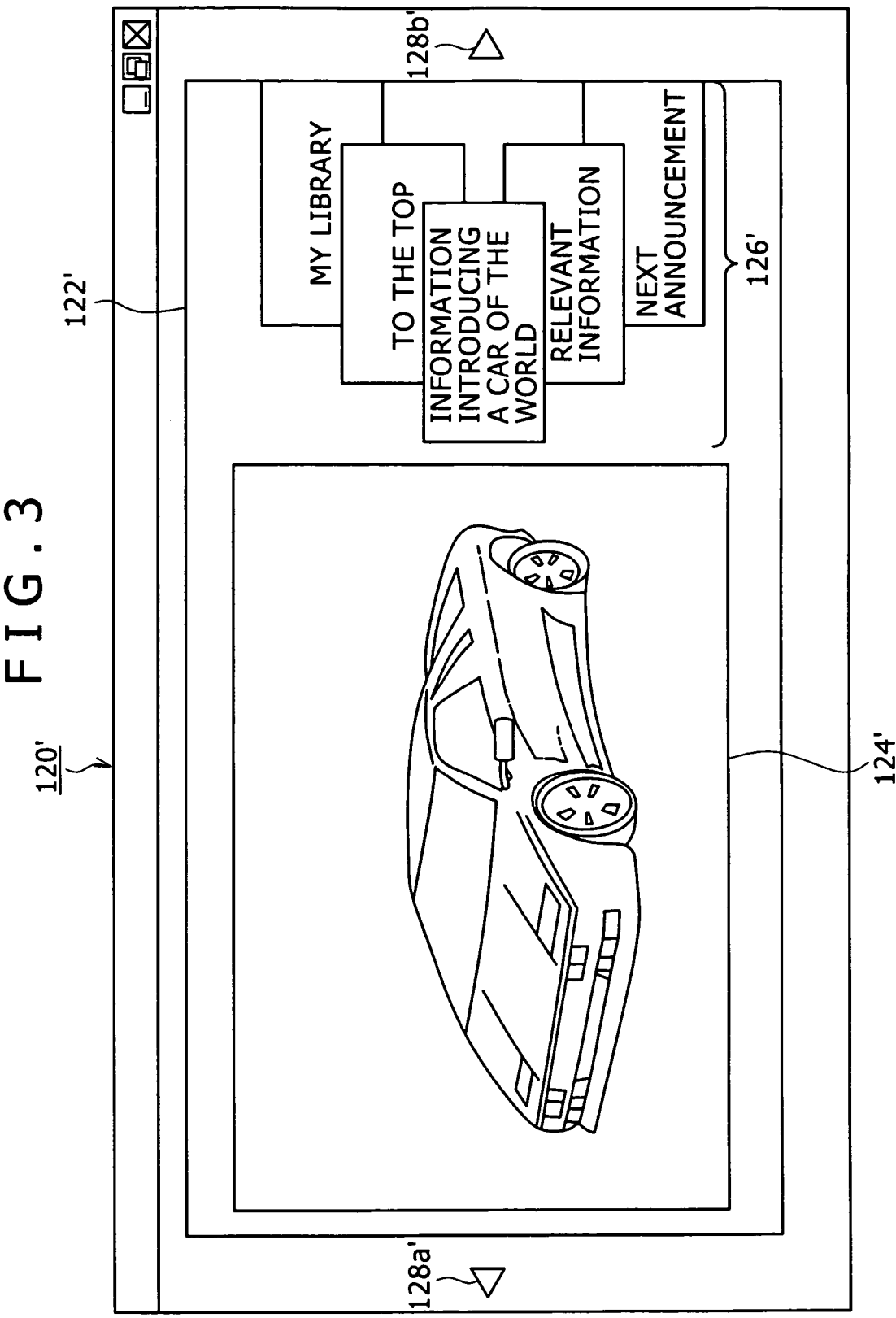
FIG. 3 is an explanatory diagram showing a typical screen of a succeeding moving image according to the first embodiment.

By referring to FIGS. 2 and 3, the following description explains the screen of a moving-image content displayed on the display section 120 employed in the moving-image reproduction apparatus 10 according to this embodiment. As shown in FIG. 2, the screen of a moving-image content according to this embodiment includes a moving-image display area 124, a button display area 126, a left button 128a and a right button 128b, which are all enclosed in a screen frame 122 of the display section 120. The left button 128a and the right button 128b each serve as a moving-image change-over command section.

The moving-image display area 124 is an area for displaying a moving image according to this embodiment. In this embodiment, as a preceding moving image, a moving image with a title of 'Information Introducing the Olympics' is reproduced. By pressing the left button 128a or the right button 128b, a moving image displayed in the moving-image display area 124 can be changed to a succeeding moving image. The button display area 126 is an area for displaying buttons to be operated to make transitions to a variety of screens. The left button 128a and the right button 128b are each a button for changing the present moving image to a succeeding moving image. To be more specific, if the left button 128a is pressed, a succeeding moving image is inserted from the left side of the screen frame 122. If the right button 128b is pressed, on the other hand, a succeeding moving image is inserted from the right side of the screen frame 122. If the right button 128b is pressed, for example, the present screen is changed over to a moving image with a title of 'Information Introducing a Car of the World' as shown in FIG. 3.

At that time, when a moving image is inserted while a preceding moving image is being reproduced, the CPU bears a large processing load. Thus, when the left button 128a or the right button 128b is operated to make a request for a change-over of a moving image in this embodiment, while a process is being carried out to read out a succeeding moving image (a second moving image) and decode the succeeding moving image, operations are performed to stop a succeeding moving image (a first moving image), gradually reduce the brightness of the moving-image display area 124 to result in a black screen and, then, change over the screen from the preceding moving image to the succeeding moving image in order to start reproduction of the succeeding moving image. In this way, in this embodiment, the processing load borne by the CPU can be minimized and, at the same time, it is possible to change over the screen from the preceding moving image to the succeeding moving image without giving discomfort to the user by an effect of the sense of sight.

Figure 4:
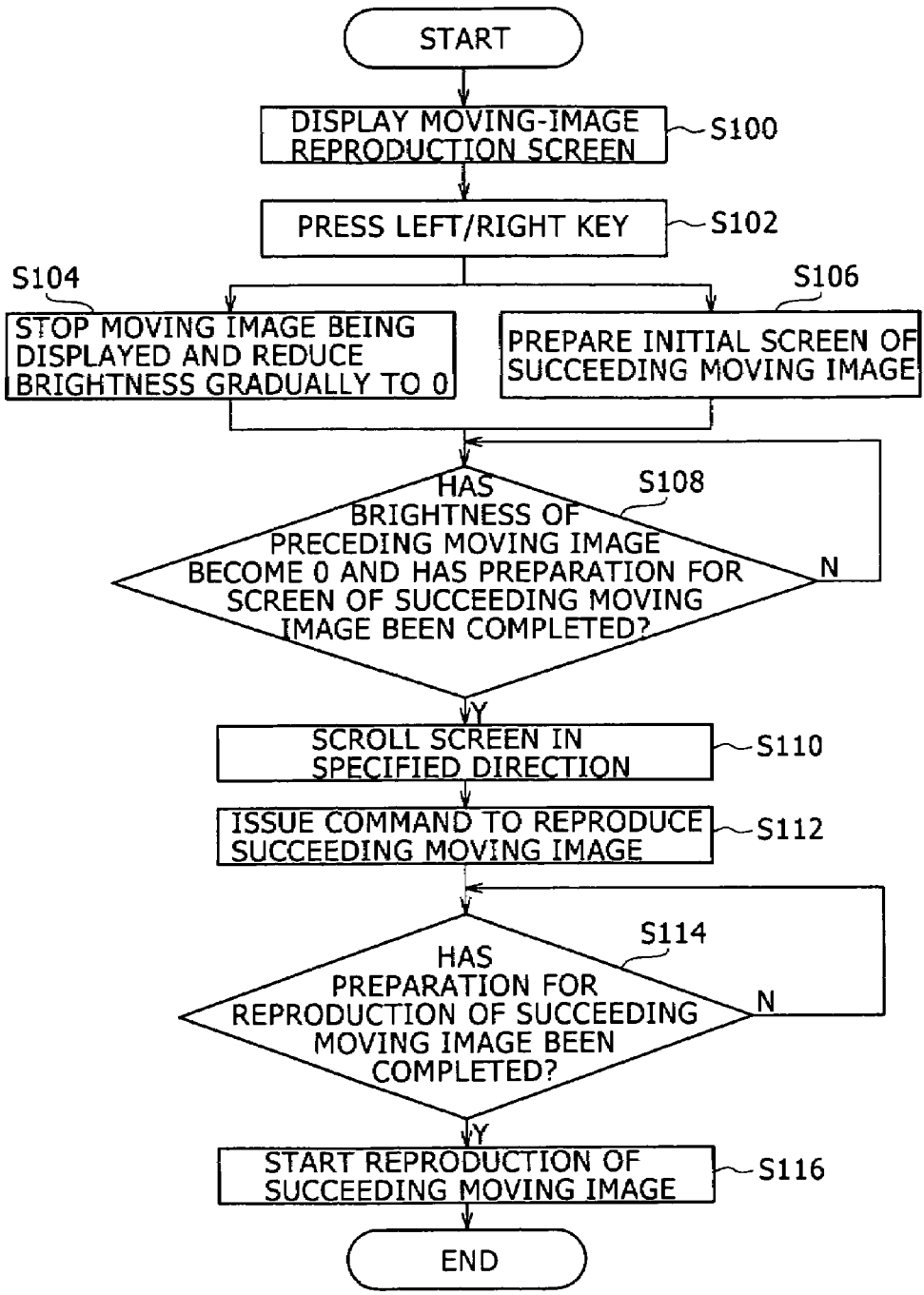
FIG. 4 shows a flowchart representing a method to reproduce a moving image in accordance with the first embodiment.

Next, a method to reproduce a moving image in accordance with a first embodiment is explained by referring to FIG. 4. It is to be noted that FIG. 4 shows a flowchart representing the method to reproduce a moving image in accordance with the first embodiment. The first embodiment is explained as an implementation of the process to change over a moving image as described above.

Figure 5:
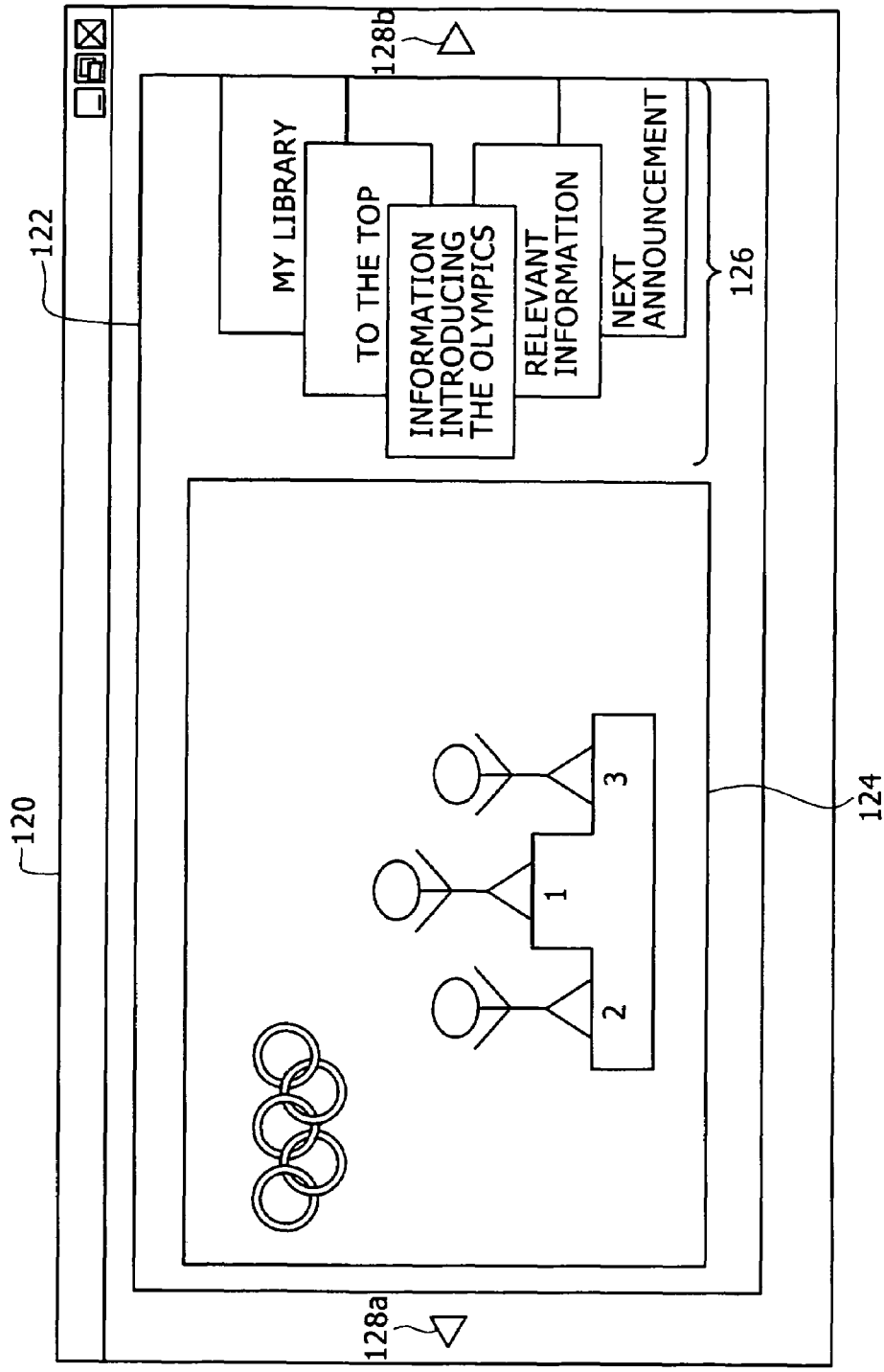
FIG. 5 is an explanatory diagram showing a typical state in which a preceding moving image is reproduced and displayed on a display screen in accordance with the first embodiment.

As shown in the figure, the flowchart begins with a step S100 at which the user operates the operation section 140 to activate an application displaying a moving-image reproduction screen of a preceding moving image. In this embodiment, a desired moving-image reproduction screen can be selected from a screen displaying a list of moving images to display a preceding moving image on the screen. It is to be noted that the list screen itself is shown in none of the figures. At that time, for example, a moving image with a title of 'Information Introducing the Olympics' is displayed in the moving-image display area 124 as shown in FIG. 5.

It is to be noted that the moving image is read out from the moving-image data storage section 150 by the moving-image data read section 170, decoded by the decoder 160 and then reproduced synchronously with a sync signal. The moving-image display control section 180 carries out a process to adjust the size of the moving-image display area 124 to a value corresponding to the amount of the moving-image data read out from the moving-image data storage section 150 and display the moving image at a predetermined display position.

Then, at the next step S102, the user presses the left button 128a or the right button 128b while the above moving image is being reproduced. To be more specific, if the user presses the right button 128b, a moving-image change command is given to the CPU 130 as a request for a transition to a succeeding moving image such as a moving image with a title of 'Information Introducing a Car of the World'. It is to be noted that the operation section 140 for driving the moving-image change-over command section 128 can have a keyboard and/or a mouse.

Subsequently, at the next step S104, assuming that the right button 128b has been pressed, reproduction of a moving image displayed in the moving-image display area 124 is stopped and the brightness is reduced gradually till the brightness becomes 0 in a period of about 0.5 seconds. In this way, with reproduction of the displayed moving image stopped, the screen of the moving-image display area 124 turns deep black. Thus, even if a task of moving-image reproduction software remains, the processing load borne by the CPU 130 is reduced to a minimum in comparison with the state in which a moving image is still being reproduced.

At all but the same time as the step S104, on the other hand, at a step S106, an initial screen of a moving image specified by the user by operating the right button 128b as the succeeding moving image with a title of 'Information Introducing a Car of the World' is prepared. That is to say, a process is carried out to read out the data of the succeeding moving image from the moving-image data storage section 150 and decode the data in the decoder 160.

Figure 6:
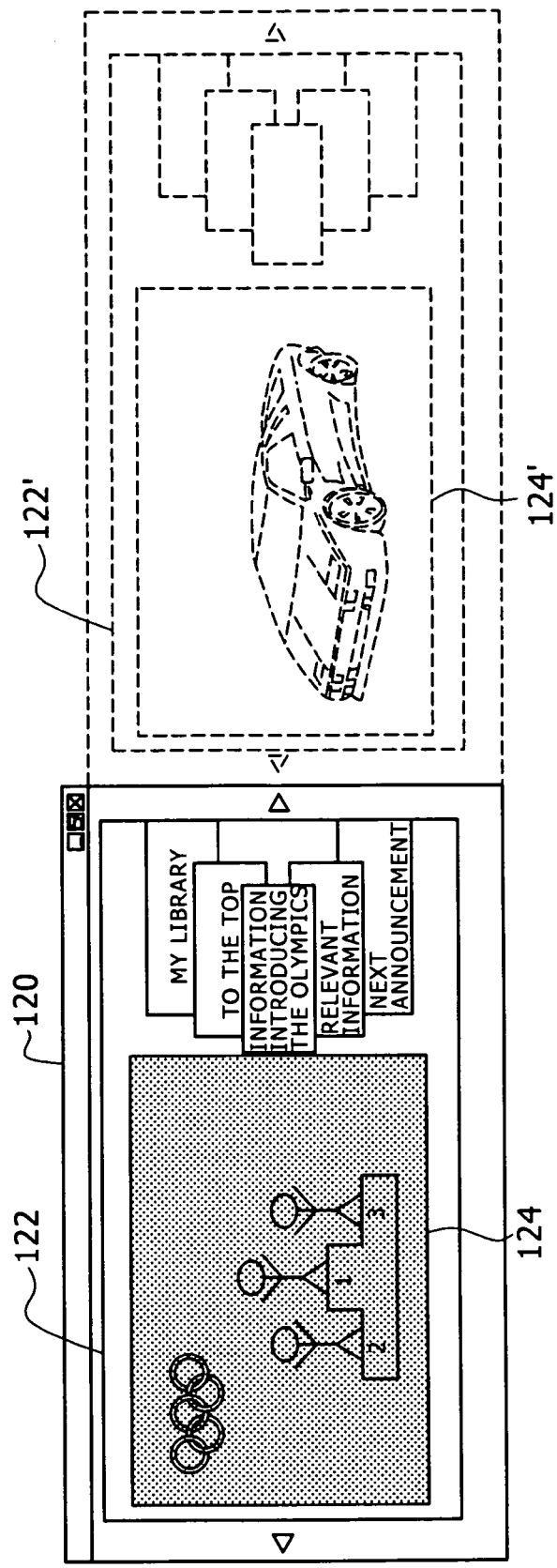
FIG. 6 is an explanatory diagram showing a typical state in which a succeeding moving image on a magazine page is prepared at all but the same time as an operation to change a preceding moving image on another magazine page gradually into a black color in accordance with the first embodiment.

As shown in FIG. 6, in the processes carried out at the steps S104 and S106, the succeeding moving image with a title of 'Information Introducing the Olympics' is gradually turning black and, at all but the same time, the succeeding moving image with a title of 'Information Introducing a Car of the World' is prepared. It is to be noted that the succeeding moving image with a title of 'Information Introducing a Car of the World' is shown on the right side of the display section 120 only to help the reader understand the explanation with ease. In actuality, however, the succeeding moving image with a title of 'Information Introducing a Car of the World' is in a state of being decoded. In addition, when the right button 128b is pressed, the succeeding moving image with a title of 'Information Introducing a Car of the World' is inserted from the right side of the display section 120.

Then, at the next step S108, the brightness of the moving-image display area 124 displaying the preceding moving image is examined to determine whether or not the brightness has become 0 representing a deep black color and the preparation for the initial screen of the succeeding moving image is checked to determine whether or not the preparation has been completed. If the brightness has not become 0 and/or the preparation has not been completed, the process of the step S108 is carried out again.

If the brightness has become 0 and the preparation has been completed, on the other hand, the flow of the processing goes on to a step S110 at which the screen is scrolled in a direction specified by the right button 128b. In this embodiment, the direction specified by the right button 128b is the left direction. That is to say, in this embodiment, when the right button 128b is pressed, a succeeding moving image is inserted from the right side. Thus, the screen is scrolled in the left direction.

Figure 7:
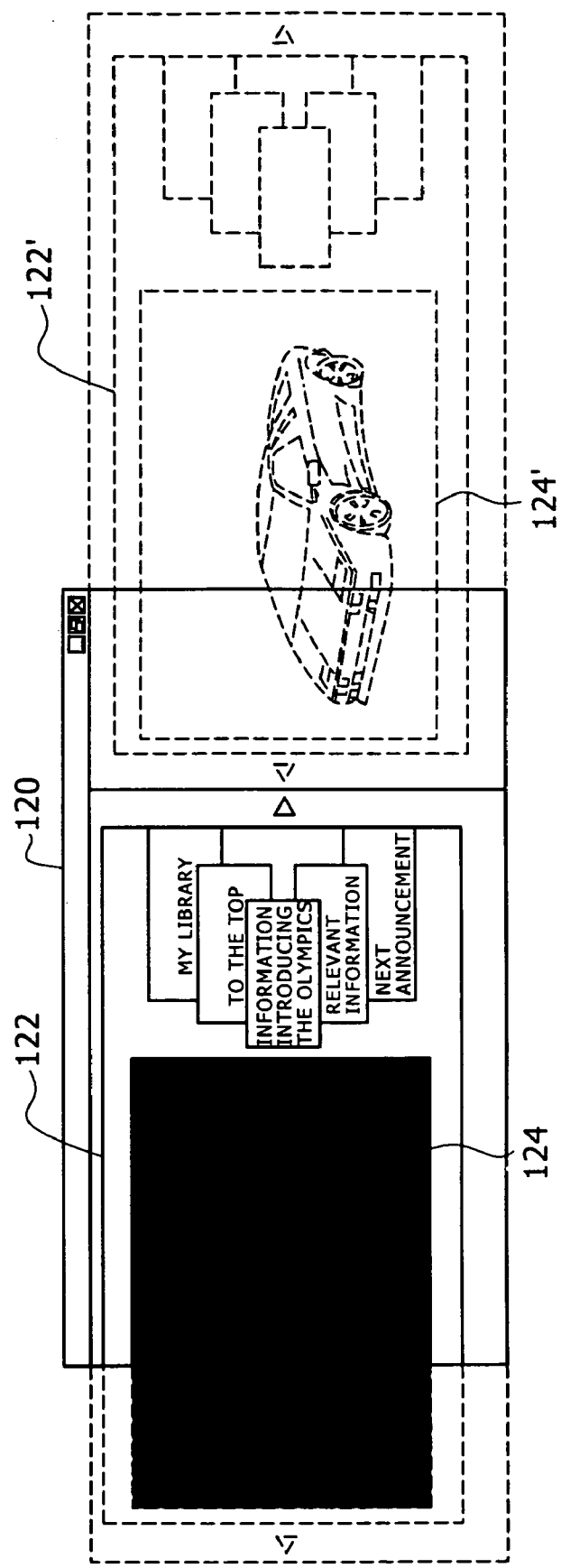
FIG. 7 is an explanatory diagram showing a typical state in which a succeeding moving image is scrolled and finally disappears while a succeeding moving image is moving from the right side to the left side gradually in accordance with the first embodiment.

For example, as shown in FIG. 7, from a state in which the screen of a preceding moving image exists at a position adjacent to the screen of a succeeding moving image, the preceding moving image is scrolled to the left side to a state of disappearance. On the other hand, the succeeding moving image is inserted gradually from the left side in the direction to the right side to appear on the screen within a typical period of about one second. The succeeding moving image is sled by a distance by which the preceding moving image is moved out from the screen.

Figure 8:
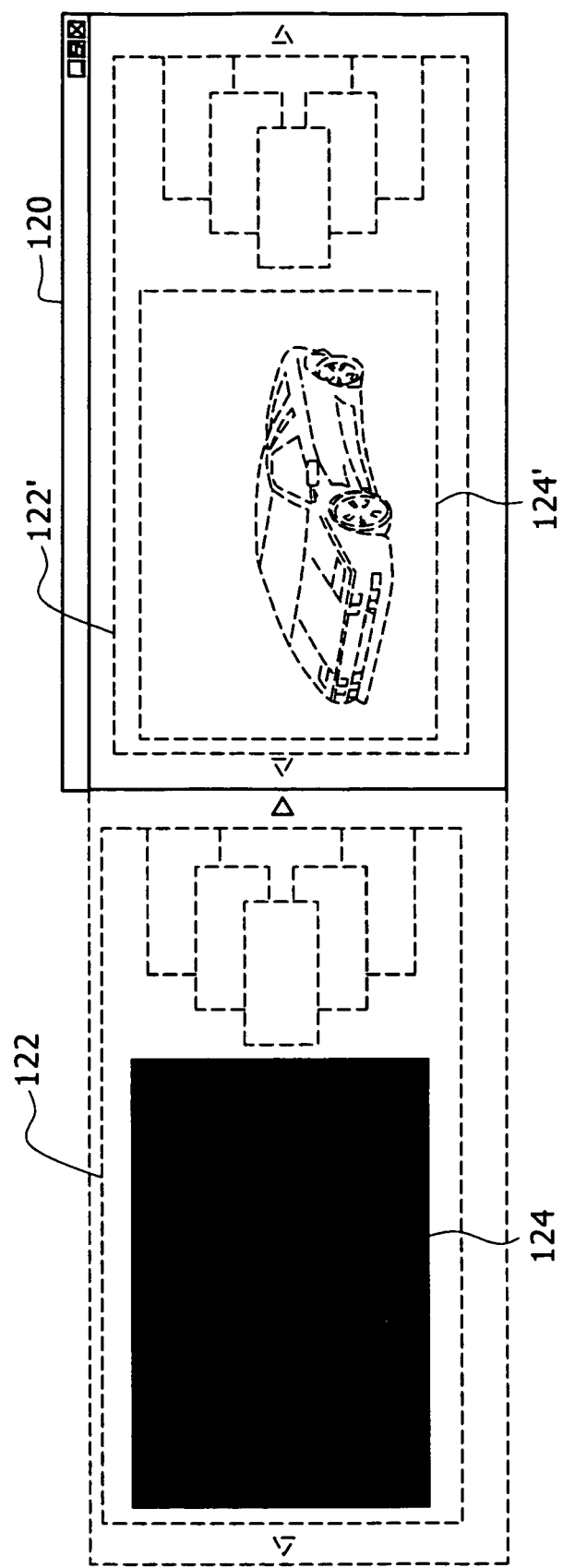
FIG. 8 is an explanatory diagram showing an initial screen, which is displayed till a succeeding moving image is reproduced in accordance with the first embodiment.
Figure 9:
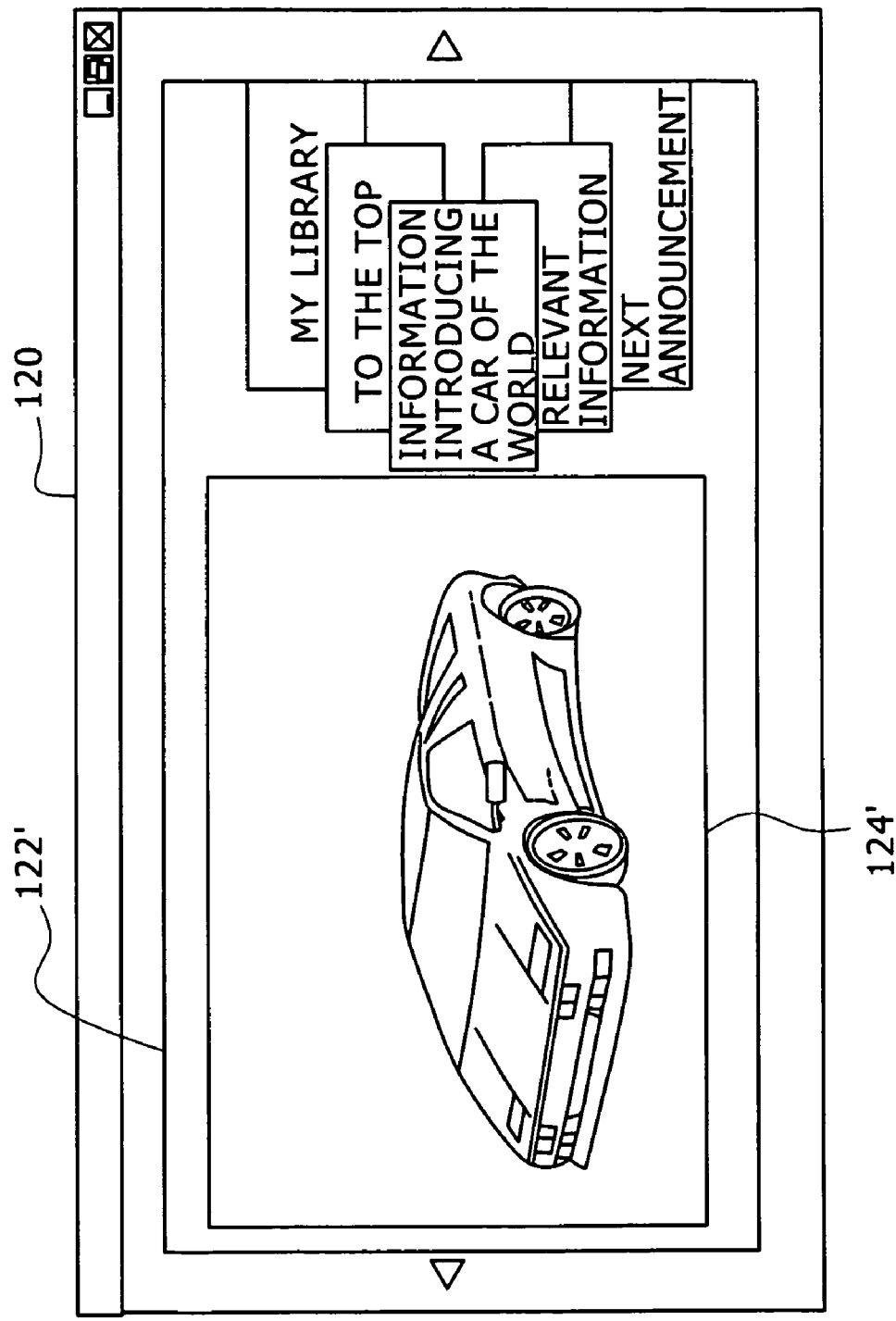
FIG. 9 is an explanatory diagram showing a state in which a succeeding moving image is reproduced in accordance with the first embodiment.

Then, at the next step S112, a command to reproduce the succeeding moving image is issued. For example, a command to reproduce the succeeding moving image is issued so that, as shown in FIG. 8, during a period of typically several seconds till the moving image is actually reproduced, the initial screen is kept as it is. Note that it is desirable to provide a configuration in which, while the succeeding moving image is being prepared, reproduction of the preceding moving image is stopped and a transition to a black screen is made gradually and, then, the succeeding moving image is reproduced with a timing of the screen turning black. Thus, during the transition from the preceding moving image to the succeeding moving image, the processing load borne by the CPU 130 can be reduced to a minimum and the screen itself is put in a dynamic state. As a result, it is possible to get rid of the discomfort that would otherwise experienced by the user.

Then, the flow of the processing goes on to a step S114 to determine whether or not the preparation for reproduction of the succeeding moving image has been completed. A moving-image reproduction task generates an interrupt revealing completion of the preparation for reproduction of the succeeding moving image. Thus, such an interrupt can be used as a basis of such determination. In some implementations, however, such an interrupt is not used. In this case, it is possible to determine whether or not the preparation for reproduction of the succeeding moving image has been completed by determining whether or not a predetermined period of time has lapsed since the issuance of a moving-image change-over instruction. The period of time is set at such a length that, at the end of the period of time, the completion of the preparation for reproduction of the succeeding moving image can be assured with a high degree of reliability.

If the preparation for reproduction of the succeeding moving image has not been completed, the process of the step S114 is carried out again. If the preparation for reproduction of the succeeding moving image has been completed, on the other hand, the flow of the processing goes on to a step S116 at which the reproduction of the succeeding moving image is started. That is to say, as the operation to change over the screen of the moving image is completed, the moving-image display control section 180 outputs the succeeding moving image to a predetermined display position in the same way as the succeeding moving image.

In this embodiment, as described above, in an operation to change over the data of a preceding moving image displayed on the display section 120 to a succeeding moving image, the CPU 130 executes control to reduce the brightness gradually to 0 at the same time as termination of reproduction of the preceding moving image during a period of time lasting till completion of a process to decode the succeeding moving image, that is, during a period of time lasting till completion of preparation for reproduction of the succeeding moving image. As the display screen turns black and the preparation for reproduction of the succeeding moving image is completed, the succeeding moving image is reproduced. As described above, in an operation to change over the data of a preceding moving image displayed on the display section 120 to a succeeding moving image in this embodiment, the brightness is reduced gradually at all but the same time as termination of reproduction of the preceding moving image and, as the display screen turns black, the screen is changed over to the succeeding moving image. Thus, no processing load is borne by the CPU 130 and no discomfort is experienced by the user by an effect of the sense of sight. It is to be noted that, in accordance with a method for reproducing a moving image, a control section monitors the state of a close key to determine whether or not the close key is pressed. If the close key is pressed, the moving-image reproduction screen is closed and the application is terminated or a transition to a page on an upper layer is made.

Second Embodiment

Figure 10:
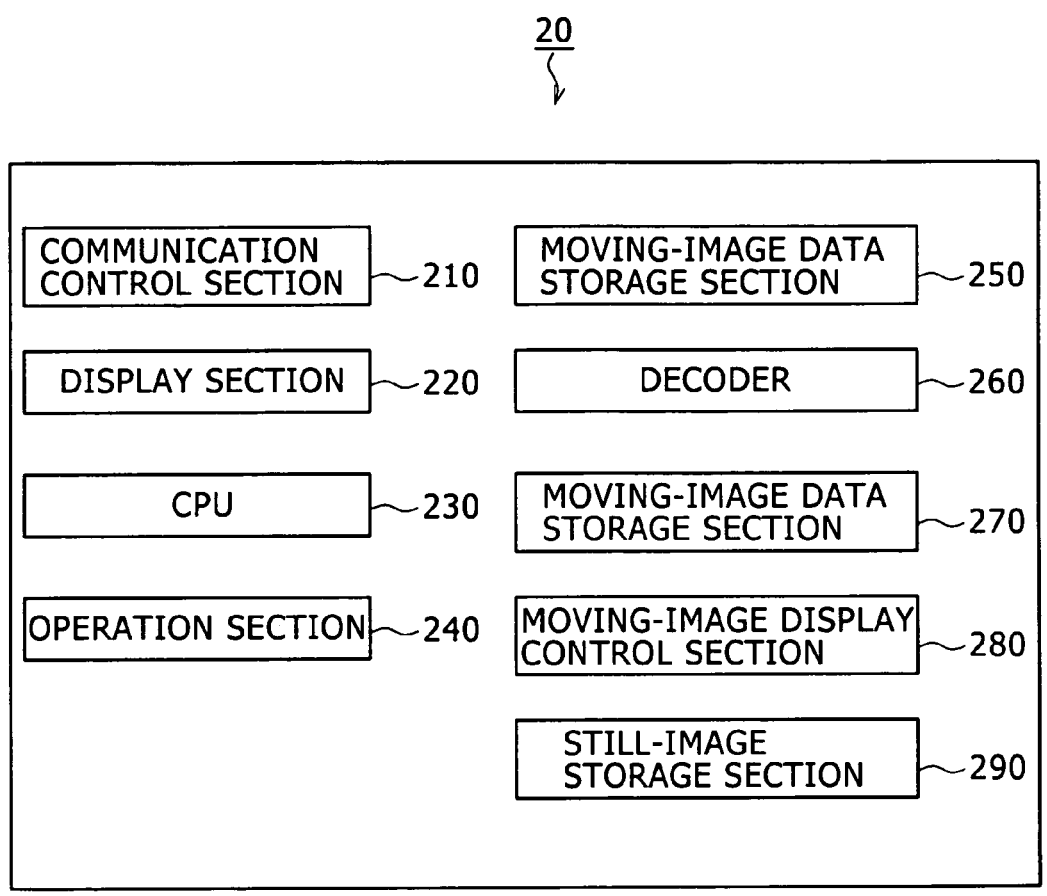
FIG. 10 is a block diagram showing the configuration of a moving-image reproduction apparatus 20 according to a second embodiment.
Figure 11:
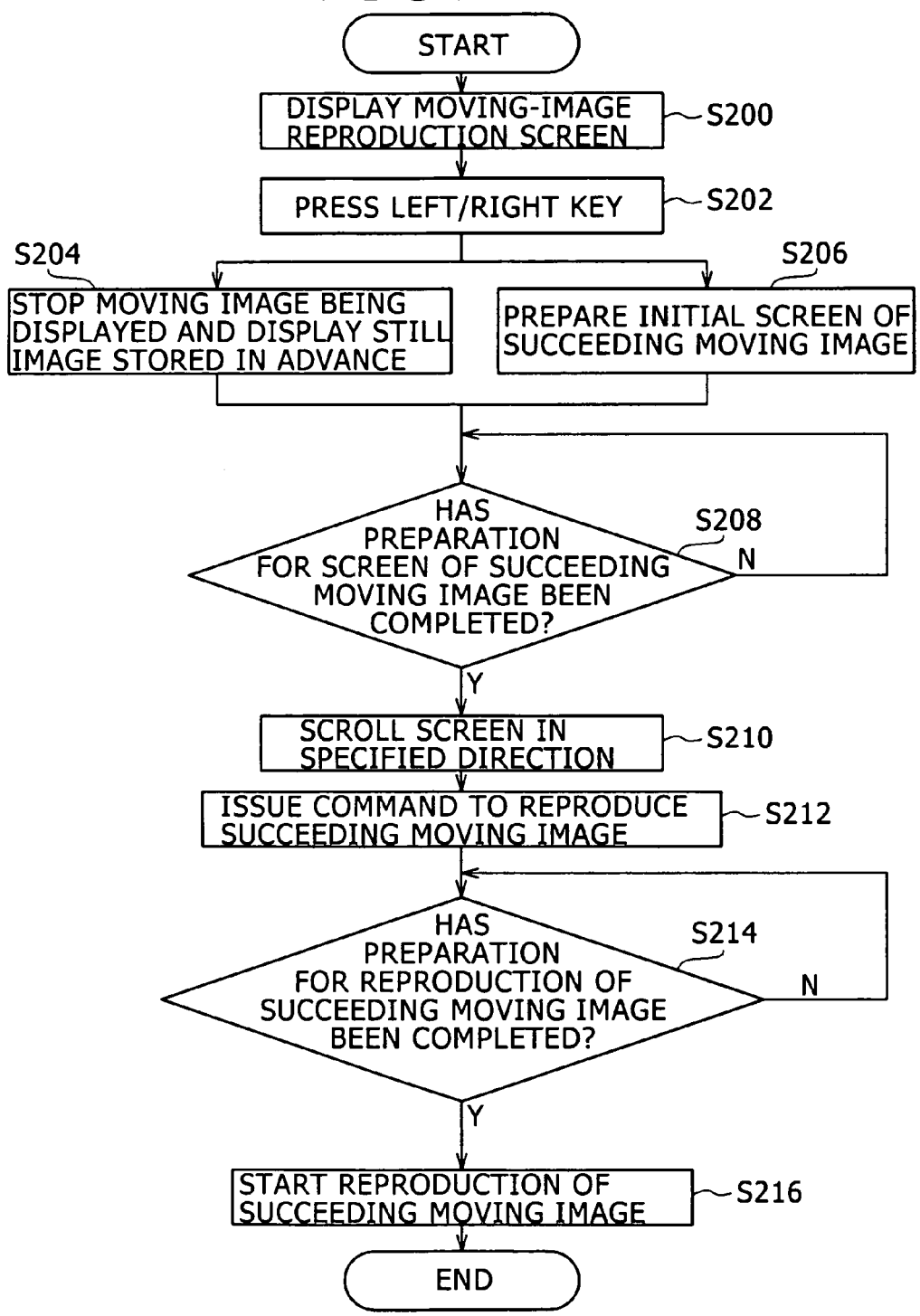
FIG. 11 shows a flowchart representing a method to reproduce a moving image in accordance with the second embodiment.
Figure 12:
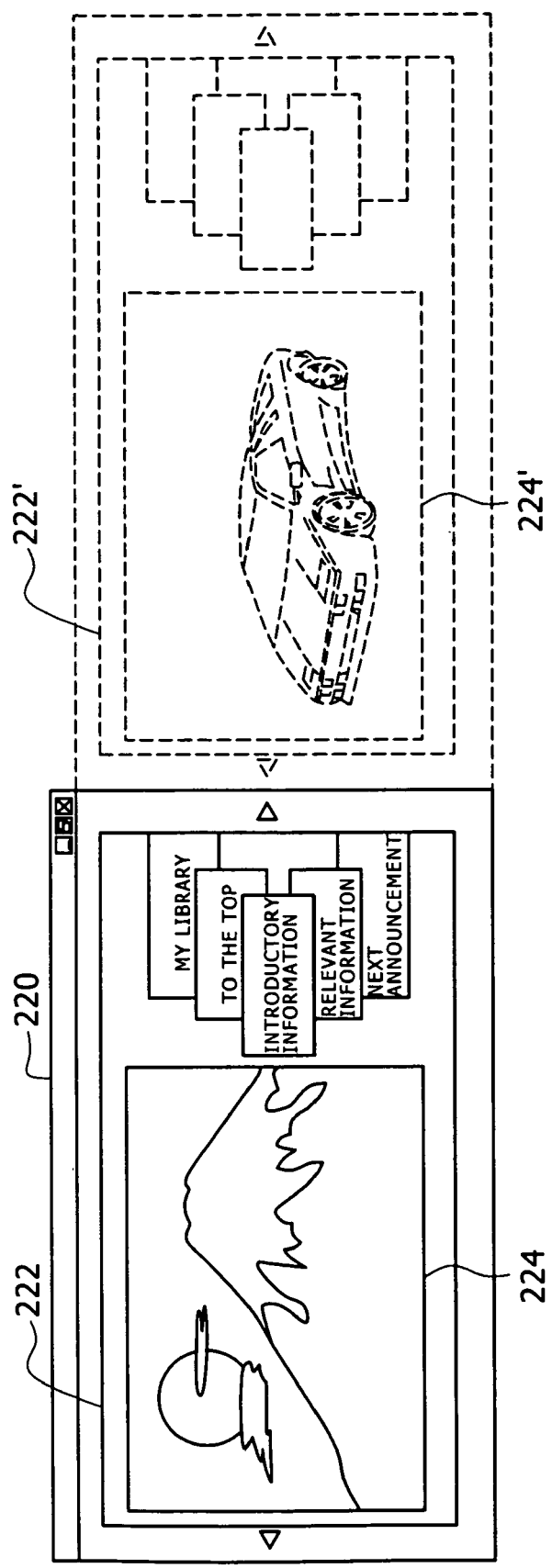
FIG. 12 is an explanatory diagram showing a typical state in which a succeeding moving image is scrolled and finally disappears while a succeeding moving image is moving from the right side to the left side gradually in accordance with the second embodiment.

By referring to FIGS. 10 to 12, the following description explains a moving-image reproduction apparatus 20 according to a second embodiment. FIG. 10 is a block diagram showing the configuration of the moving-image reproduction apparatus 20 according to the second embodiment. The moving-image reproduction apparatus 20 according to the second embodiment is different from the moving-image reproduction apparatus 10 according to the first embodiment in that, in an operation carried out in the moving-image reproduction apparatus 20 to change over a moving image, a still picture set in advance is displayed on the screen.

First of all, as shown in FIG. 10, the moving-image reproduction apparatus 20 according to the second embodiment has a communication control section 210, a display section 220, a CPU 230, an operation section 240, a moving-image data storage section 250, a decoder 260, a moving-image data read section 270, a moving-image display control section 280 and a still-image storage section 290. The communication control section 210 is a component for controlling communications with a moving-image-providing server for providing moving images. The display section 220 is a component for displaying a moving-image content transmitted by the moving-image-providing server (not shown in the figure). The CPU 230 is a component for executing entire control of the moving-image reproduction apparatus 20. The operation section 240 is a component used for carrying out a variety of operations of the moving-image reproduction apparatus 20. The moving-image data storage section 250 is a memory used for storing moving-image data received from the moving-image-providing server. The decoder 260 is a component for decoding moving-image data. The moving-image data read section 270 is a component for reading out moving-image data from the moving-image data storage section 250. The moving-image display control section 280 is a component for executing various kinds of control of attributes of a moving image. The attributes include the display position and size of the moving image. The still-image storage section 290 is a memory for storing one or more still images acquired in advance. It is to be noted that the communication control section 210, the display section 220, the CPU 230, the operation section 240, the moving-image data storage section 250, the decoder 260, the moving-image data read section 270 and the moving-image display control section 280 are identical with respectively to corresponding components which are employed in the first embodiment. For this reason, they are not explained in detail to avoid duplication.

The still-image storage section 290 is used for storing one or more still images that can be displayed in a moving-image display area 224 in an operation to change over the screen from a preceding moving image to a succeeding moving image. If a still image common to all moving images is to be displayed in the moving-image display area 224, for example, it is nice to have the still-image storage section 290 with a size large enough for storing one still image. If one of a plurality of different still images is to be displayed in the moving-image display area 224 in dependence on the moving image, on the other hand, it is necessary to have the still-image storage section 290 with a size large enough for accommodating the still images. If it is desired to display a still image relevant to a succeeding moving image, for example, an initial screen of the succeeding moving image or the still image of a desired moving-image scene can be stored in the still-image storage section 290.

In this embodiment, during a period of time lasting till completion of preparation for reproduction of the succeeding moving image, a proper still image designated as a display image in advance is displayed in the moving-image display area 224. As a result, the user can be relieved from discomfort effectively.

Next, a method of reproducing a moving image in accordance with the second embodiment is explained by referring to FIG. 11. It is to be noted that FIG. 11 shows a flowchart representing the method of reproducing a moving image in accordance with the second embodiment.

As shown in the figure, the flowchart begins with a step S200 at which the user carries out an operation to activate an application to display a preceding moving image in the moving-image display area 224. In this embodiment, a desired moving-image reproduction screen can be selected from a screen displaying a list of moving images to display a preceding moving image on the screen. It is to be noted that the list screen itself is shown in none of the figures.

It is to be noted that the moving image is read out from the moving-image data storage section 250 by the moving-image data read section 270, decoded by the decoder 260 and then reproduced synchronously with a sync signal. The moving-image display control section 280 carries out a process to adjust the size of the moving-image display area 224 to a value corresponding to the amount of the moving-image data read out from the moving-image data storage section 250 and display the moving image at a predetermined display position.

Then, at the next step S202, the user presses a left button 228*a* or a right button 228*b* while the above moving image is being reproduced. To be more specific, if the user presses the right button 228*b*, a moving-image change command is given to the CPU 230 as a request for a transition to a succeeding moving image such as a moving image with a title of 'Information Introducing a Car of the World'. It is to be noted that the operation section 240 for driving the moving-image change-over command section 228 can have a keyboard and/or a mouse.

Subsequently, at the next step S204, assuming that the right button 228*b* has been pressed, reproduction of a moving image displayed in the moving-image display area 224 is stopped and a still image stored in advance is displayed in the moving-image display area 224. In this way, in this embodiment, till a succeeding moving image is displayed, a proper still image assigned to the succeeding moving image in advance is displayed in the moving-image display area 224. Thus, the user can be relieved from discomfort effectively. In this case, a still image common to all moving images can be displayed in the moving-image display area 224. As an alternative, any of a plurality of different still images can be displayed in the moving-image display area 224 in dependence on the moving image. As another alternative, it is possible to display a still image relevant to a succeeding moving image.

At all but the same time as the step S204, on the other hand, at the step S206, an initial screen of a moving image specified by the user by operating the right button 228*b* as the succeeding moving image with a title of 'Information Introducing a Car of the World' is prepared. That is to say, a process is carried out to read out the data of the succeeding moving image from the moving-image data storage section 250 and decode the data in the decoder 260.

As shown in FIG. 12, in the processes carried out at the steps S204 and S206, reproduction of the succeeding moving image with a title of 'Information Introducing the Olympics' is stopped and a predetermined still image such as a picture of Mount Fuji is displayed. At all but the same time, the succeeding moving image with a title of 'Information Introducing a Car of the World' is prepared. It is to be noted that the succeeding moving image with a title of 'Information Introducing a Car of the World' is shown on the right side of the display section 220 only to help the reader understand the explanation with ease. In actuality, however, the succeeding moving image with a title of 'Information Introducing a Car of the World' is in a state of being decoded. In addition, when the right button 228*b* is pressed, the succeeding moving image with a title of 'Information Introducing a Car of the World' is inserted from the right side of the display section 220.

Then, at the next step S208, the preparation for the initial screen of the succeeding moving image is checked to determine whether or not the preparation has been completed. If the preparation has not been completed, the process of the step S208 is carried out again.

If the preparation has been completed, on the other hand, the flow of the processing goes on to a step S210 at which the screen is scrolled in a direction specified by the right button 228*b*. In this embodiment, the direction specified by the right button 228*b* is the left direction. That is to say, in this embodiment, when the right button 228*b* is pressed, a succeeding moving image is inserted from the right side. Thus, the screen is scrolled in the left direction. For example, from a state in which the screen of a preceding moving image exists at a position adjacent to the screen of a succeeding moving image, the preceding moving image is scrolled to the left side to a state of disappearance. On the other hand, the succeeding moving image is inserted gradually from the left side in the direction to the right side to appear on the screen within a typical period of about one second.

Then, at the next step S212, a command to reproduce the succeeding moving image is issued. For example, a command to reproduce the succeeding moving image is issued so that, during a period of typically several seconds till the moving image is actually reproduced, the initial screen is kept as it is.

Then, the flow of the processing goes on to a step S214 to determine whether or not the preparation for reproduction of the succeeding moving image has been completed. A moving-image reproduction task generates an interrupt revealing completion of the preparation for reproduction of the succeeding moving image. Thus, such an interrupt can be used as a basis of such determination. In some implementations, however, such an interrupt is not used. In this case, it is possible to determine whether or not the preparation for reproduction of the succeeding moving image has been completed by determining whether or not a predetermined period of time has lapsed since the issuance of a moving-image change-over instruction. The period of time is set at such a length that, at the end of the period of time, the completion of the preparation for reproduction of the succeeding moving image can be assured with a high degree of reliability. It is to be noted that, after such an interrupt or after the lapse of the predetermined period of time, the still image disappears.

If the preparation for reproduction of the succeeding moving image has not been completed, the process of the step S214 is carried out again. If the preparation for reproduction of the succeeding moving image has been completed, on the other hand, the flow of the processing goes on to a step S216 at which the reproduction of the succeeding moving image is started. That is to say, as the operation to change over the screen of the moving image is completed, the moving-image display control section 280 outputs the succeeding moving image to a predetermined display position in the same way as the succeeding moving image. It is to be noted that, if the operation to display the still image has been carried out at the highest layer, by removing this still image, a moving-image screen reproducible at a lower layer can be displayed.

In this embodiment, as described above, a proper still image assigned in advance to a succeeding moving image is displayed till the succeeding moving image appears. As a result, the user can be relieved from discomfort effectively.

Third Embodiment

Figure 13:
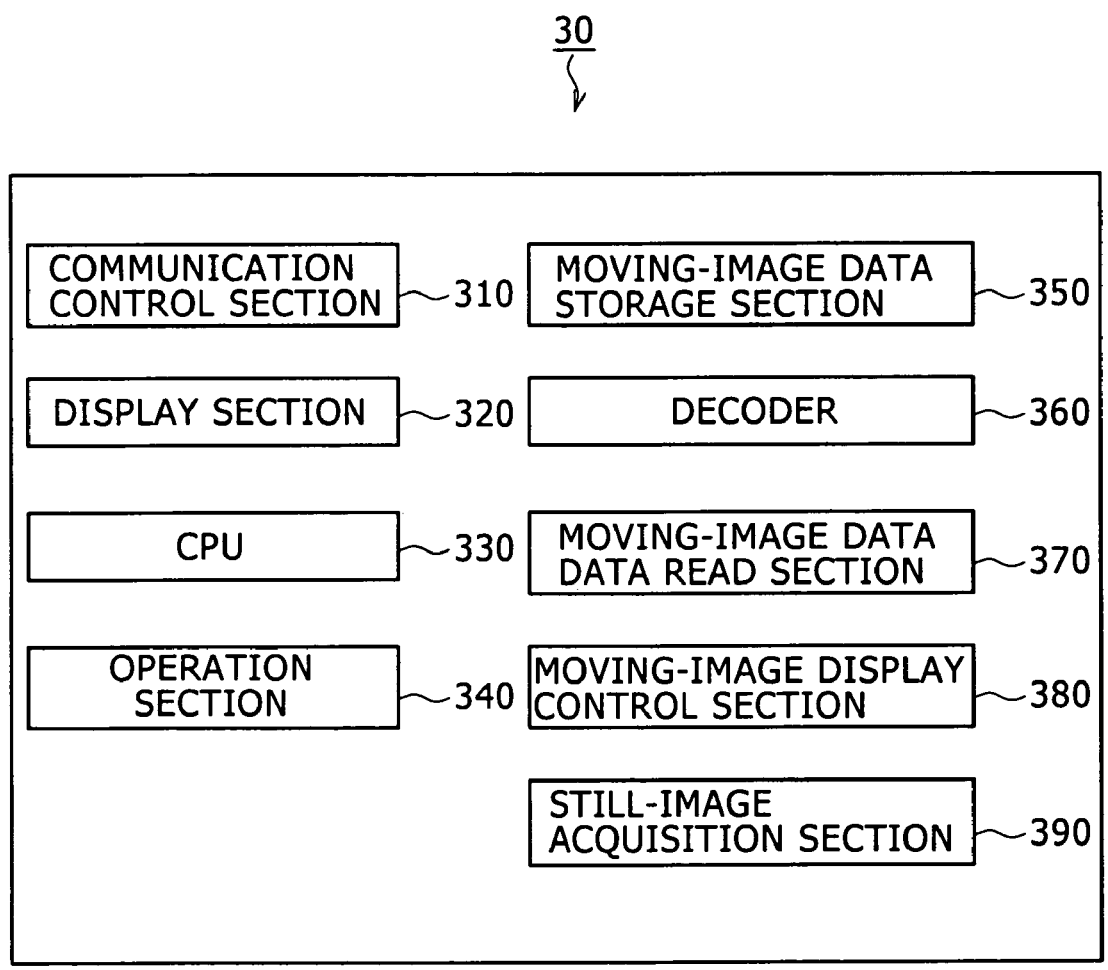
FIG. 13 is a block diagram showing the configuration of a moving-image reproduction apparatus 30 according to a third embodiment.

By referring to FIGS. 13 to 15, the following description explains a moving-image reproduction apparatus 30 according to a third embodiment. FIG. 13 is a block diagram showing the configuration of the moving-image reproduction apparatus 30 according to the third embodiment. The moving-image reproduction apparatus 30 according to the third embodiment is different from the moving-image reproduction apparatus 10 according to the first embodiment in that, in an operation carried out in the moving-image reproduction apparatus 30 to change over a moving image, a still picture, which appears in a moving-image display area 324 at the time reproduction of the preceding moving image is stopped, is displayed on the screen.

First of all, as shown in FIG. 13, the moving-image reproduction apparatus 30 according to the third embodiment has a communication control section 310, a display section 320, a CPU 330, an operation section 340, a moving-image data storage section 350, a decoder 360, a moving-image data read section 370, a moving-image display control section 380 and a still-image acquisition section 390. The communication control section 310 is a component for controlling communications with a moving-image-providing server for providing moving images. The display section 320 is a component for displaying a moving-image content transmitted by the moving-image-providing server (not shown in the figure). The CPU 330 is a component for executing entire control of the moving-image reproduction apparatus 30. The operation section 340 is a component used for carrying out a variety of operations of the moving-image reproduction apparatus 30. The moving-image data storage section 350 is a memory used for storing moving-image data received from the moving-image-providing server. The decoder 360 is a component for decoding moving-image data. The moving-image data read section 370 is a component for reading out moving-image data from the moving-image data storage section 350. The moving-image display control section 380 is a component for executing various kinds of control of attributes of a moving image. The attributes include the display position and size of the moving image. The still-image acquisition section 390 is a component for acquiring a still picture, which appears in the moving-image display area 324 at the time reproduction of the preceding moving image is stopped. It is to be noted that the communication control section 310, the display section 320, the CPU 330, the operation section 340, the moving-image data storage section 350, the decoder 360, the moving-image data read section 370 and the moving-image display control section 380 are identical with respectively to corresponding components which are employed in the first embodiment. For this reason, they are not explained in detail to avoid duplication.

As described above, the still-image acquisition section 390 acquires a still picture, which appears in the moving-image display area 324 at the time reproduction of the preceding moving image is stopped. The acquired still picture is kept in the moving-image display area 324 as it is when the screen is being changed over from a preceding moving image to a succeeding moving image.

In this embodiment, a still picture of the preceding moving image is displayed in the moving-image display area 324 till the succeeding moving image appears in the moving-image display area 324. As a result, the user can be relieved from discomfort effectively.

Next, a method of reproducing a moving image in accordance with the third embodiment is explained by referring to FIG. 14. It is to be noted that FIG. 14 shows a flowchart representing the method of reproducing a moving image in accordance with the third embodiment.

As shown in the figure, the flowchart begins with a step S300 at which the user carries out an operation to activate an application to display a preceding moving image in the moving-image display area 224. In this embodiment, a desired moving-image reproduction screen can be selected from a screen displaying a list of moving images to display a preceding moving image on the screen. It is to be noted that the list screen itself is shown in none of the figures.

It is also worth noting that the moving image is read out from the moving-image data storage section 350 by the moving-image data read section 370, decoded by the decoder 360 and then reproduced synchronously with a sync signal. The moving-image display control section 380 carries out a process to adjust the size of the moving-image display area 324 to a value corresponding to the amount of the moving-image data read out from the moving-image data storage section 350 and display the moving image at a predetermined display position.

Then, at the next step S302, the user presses a left button 328a or a right button 328b while the above moving image is being reproduced. To be more specific, if the user presses the right button 328b, a moving-image change command is given to the CPU 330 as a request for a transition to a succeeding moving image such as a moving image with a title of 'Information Introducing a Car of the World'.

Subsequently, at the next step S304, assuming that the right button 328b has been pressed, reproduction of a moving image displayed in the moving-image display area 324 is stopped and the still-image acquisition section 390 acquires the still image of the stopped moving image, displaying the still image in the moving-image display area 324. In this way, in this embodiment, till a succeeding moving image is displayed, a still image acquired from the stopped moving image is displayed in the moving-image display area 324. Thus, the user can be relieved from discomfort effectively.

At all but the same time as the step S304, on the other hand, at the step S306, an initial screen of a moving image specified by the user by operating the right button 328b as the succeeding moving image with a title of 'Information Introducing a Car of the World' is prepared. That is to say, a process is carried out to read out the data of the succeeding moving image from the moving-image data storage section 350 and decode the data in the decoder 360.

As shown in FIG. 15, in the processes carried out at the steps S304 and S306, reproduction of the succeeding moving image with a title of 'Information Introducing the Olympics' is stopped and the still image acquired from the stopped succeeding moving image is displayed. At all but the same time, the succeeding moving image with a title of 'Information Introducing a Car of the World' is prepared. It is to be noted that the succeeding moving image with a title of 'Information Introducing a Car of the World' is shown on the right side of the display section 320 only to help the reader understand the explanation with ease. In actuality, however, the succeeding moving image with a title of 'Information Introducing a Car of the World' is in a state of being decoded. In addition, when the right button 328b is pressed, the succeeding moving image with a title of 'Information Introducing a Car of the World' is inserted from the right side of the display section 320.

Then, at the next step S308, the preparation for the initial screen of the succeeding moving image is checked to determine whether or not the preparation has been completed. If the preparation has not been completed, the process of the step S308 is carried out again.

If the preparation has been completed, on the other hand, the flow of the processing goes on to a step S310 at which the screen is scrolled in a direction specified by the right button 328b. In this embodiment, the direction specified by the right button 328b is the left direction. That is to say, in this embodiment, when the right button 328b is pressed, a succeeding moving image is inserted from the right side. Thus, the screen is scrolled in the left direction. For example, from a state in which the screen of a preceding moving image exists at a position adjacent to the screen of a succeeding moving image, the preceding moving image is scrolled to the left side to a state of disappearance. On the other hand, the succeeding moving image is inserted gradually from the left side in the direction to the right side to appear on the screen within a typical period of about one second.

Then, at the next step S312, a command to reproduce the succeeding moving image is issued. For example, a command to reproduce the succeeding moving image is issued so that, during a period of typically several seconds till the moving image is actually reproduced, the initial screen is kept as it is. It is to be noted that, while the succeeding moving image was being prepared, reproduction of the preceding moving image was stopped and a still image of the stopped preceding moving image was displayed as described earlier. Thus, during the transition from the preceding moving image to the succeeding moving image, the processing load of the CPU 130 can be reduced to a minimum and the screen itself is put in a dynamic state. As a result, it is possible to get rid of the discomfort that would otherwise experienced by the user.

Then, the flow of the processing goes on to a step S314 to determine whether or not the preparation for reproduction of the succeeding moving image has been completed. A moving-image reproduction task generates an interrupt revealing completion of the preparation for reproduction of the succeeding moving image. Thus, such an interrupt can be used as a basis of such determination. In some implementations, however, such an interrupt is not used. In this case, it is possible to determine whether or not the preparation for reproduction of the succeeding moving image has been completed by determining whether or not a predetermined period of time has lapsed since the issuance of a moving-image change-over instruction. The period of time is set at such a length that, at the end of the period of time, the completion of the preparation for reproduction of the succeeding moving image can be assured with a high degree of reliability. It is to be noted that, after such an interrupt or after the lapse of the predetermined period of time, the still image disappears.

If the preparation for reproduction of the succeeding moving image has not been completed, the process of the step S314 is carried out again. If the preparation for reproduction of the succeeding moving image has been completed, on the other hand, the flow of the processing goes on to a step S316 at which the reproduction of the succeeding moving image is started. That is to say, as the operation to change over the screen of the moving image is completed, the moving-image display control section 380 outputs the succeeding moving image to a predetermined display position in the same way as the succeeding moving image. It is to be noted that, if the operation to display the still image has been carried out at the highest layer, by removing this still image, a moving-image screen reproducible at a lower layer can be displayed.

In this embodiment, as described above, a still image of a succeeding moving image in a stopped state is displayed till the succeeding moving image appears. As a result, the user can be relieved from discomfort effectively.

Preferred embodiments of the present invention have been described by referring to appended diagrams. It is needless to say, however, that the present invention is by no means limited to the embodiments. It is obvious that a person skilled in the art is capable of coming up with a variety of changes and modifications within ranges described in appended claims. However, such changes and modifications are of course regarded as changes and modifications falling in a technological range of the present invention.

For example, one of the above embodiments has a configuration in which a preceding moving image turns black in an operation to switch a moving-image screen. However, the present invention is by no means limited to the embodiment. For example, the preceding moving image may turn into another color. It is to be noted that, in this case, the screen can be handled in the same way as the second embodiment.

In addition, the above embodiments each have a configuration in which the size of the moving-image display area is not changed or the moving image moves with the screen frame fixed at a fixed location. However, the present invention is by no means limited to the embodiments. For example, the moving-image display section may also move a preceding moving image or a succeeding moving image by changing the size of the moving-image display area and/or varying the display position of the moving image.

The present invention can be applied to applications including a moving-image reproduction apparatus and a moving-image reproduction method. To put it in more detail, the present invention can be applied to applications including a moving-image reproduction apparatus capable of changing over a moving image continuously.

It should be understood by those skilled in the art that a variety of modifications, combinations, sub-combinations and alterations may occur in dependence on design requirements and other factors insofar as they are within the scope of the appended claims or the equivalents thereof.

What is claimed is:

1. A moving-image reproduction apparatus comprising:
   a display section for displaying an image in a moving-image display area;
   a moving-image data storage section for storing a plurality of pieces of moving-image data;
   a moving-image data reproduction section for reading out moving-image data from said moving-image data storage section and reproducing said moving-image data;

a moving-image change-over command section for making a request for a change-over from a first moving image to a second moving image; and a control section for carrying out a change-over from a first moving image to a second moving image in accordance with said request made by said moving-image change-over command section, wherein, during a period of time lasting till a start of a process carried out by said moving-image data reproduction section to actually reproduce data of a second moving image, said control section stops reproduction of said first moving image and reduces the brightness of said moving-image display area to a value corresponding to a black moving image in a predetermined period of time.

2. The moving-image reproduction apparatus according to claim 1, wherein said control section changes over a moving-image screen by inserting a moving-image display area showing a second moving image into said display section in a manner interlocked with an operation to move out a moving-image display area showing a first moving image from said display section.

3. The moving-image reproduction apparatus according to claim 2 wherein said control section changes over a moving-image screen while changing at least either the size or display location of said moving-image display area showing a first moving image or said moving-image display area showing a second moving image.

4. A moving-image reproduction method adopted by a moving-image reproduction apparatus comprising:

a display section for displaying an image in a moving-image display area;

a moving-image data storage section for storing a plurality of pieces of moving-image data;

a moving-image data reproduction section for reading out moving-image data from said moving-image data storage section and reproducing said moving-image data;

a moving-image change-over command section for making a request for a change-over from a first moving image to a second moving image; and a control section for carrying out a change-over from a first moving image to a second moving image in accordance with said request made by said moving-image change-over command section, wherein when said moving-image change-over command section makes a request for a change-over from a first moving image displayed earlier to a second moving image, during a period of time lasting till a start of a process carried out by said moving-image data reproduction section to actually reproduce data of a second moving image, said control section stops reproduction of said first moving image and reduces the brightness of said moving-image display area to a value corresponding to a black moving image in a predetermined period of time.

5. A computer-readable storage medium storing therein a program which, when executed by a computer, causes the computer to execute a method for driving a moving-image reproduction apparatus comprising:

displaying an image in a moving-image display area;

storing a plurality of pieces of moving-image data;

reading out moving-image data from said moving-image data storage section and reproducing said moving-image data;

making a request for a change-over from a first moving image to a second moving image; and carrying out a change-over from a first moving image to a second moving image in accordance with said request made by said moving-image change-over command section, wherein, during a period of time lasting till a start of a process carried out by said moving-image data reproduction section to actually reproduce data of a second moving image, reproduction of said first moving image is stopped and brightness of said moving-image display area is reduced to a value corresponding to a black moving image in a predetermined period of time.

* * * * *